(12) United States Patent
Agrawal et al.

(10) Patent No.: US 8,522,085 B2
(45) Date of Patent: Aug. 27, 2013

(54) LEARNING PROGRAM BEHAVIOR FOR ANOMALY DETECTION

(75) Inventors: Hiralal Agrawal, Bridgewater, NJ (US); Clifford Behrens, Madison, NJ (US); Balakrishnan Dasarathy, Bridgewater, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 884 days.

(21) Appl. No.: 12/694,806

(22) Filed: Jan. 27, 2010

(65) Prior Publication Data

US 2011/0185230 A1 Jul. 28, 2011

(51) Int. Cl.
*G06F 11/00* (2006.01)

(52) U.S. Cl.
USPC .............................. 714/47.1; 714/38.1; 714/26

(58) Field of Classification Search
None
See application file for complete search history.

(56) References Cited

U.S. PATENT DOCUMENTS

| | | | |
|---|---|---|---|
| 7,873,947 B1 * | 1/2011 | Lakhotia et al. | 717/126 |
| 2004/0039968 A1 * | 2/2004 | Hatonen et al. | 714/39 |
| 2004/0216061 A1 * | 10/2004 | Floyd et al. | 716/4 |
| 2005/0188263 A1 * | 8/2005 | Gross et al. | 714/25 |
| 2006/0053422 A1 * | 3/2006 | Alikacem et al. | 718/100 |
| 2007/0260950 A1 | 11/2007 | Morrison et al. | |
| 2008/0155326 A1 * | 6/2008 | Agazzi et al. | 714/26 |
| 2010/0185903 A1 * | 7/2010 | Horn et al. | 714/51 |
| 2010/0299654 A1 * | 11/2010 | Vaswani et al. | 717/128 |

OTHER PUBLICATIONS

International Search Report, Dated Jun. 9, 2010.

* cited by examiner

*Primary Examiner* — Scott Baderman
*Assistant Examiner* — Jason Bryan
(74) *Attorney, Agent, or Firm* — Lowenstein Sandler LLP (57) ABSTRACT

A computer-enabled method of learning the behavior of a program. A processor can execute a target program during a learning interval while varying a plurality of stimuli provided to the target program so as to produce a multiplicity of different sequences of events which differ in combinations of types of events in respective sequences, orders in which the types of events occur in respective sequences, or in the combinations and in the orders in which the types of events occur. The multiplicity of event sequences can be recorded, and a second program can be executed by a processor to: determine a plurality of clusters based on similarities between the event sequences in their entirety; and determine a plurality of signatures corresponding to the plurality of clusters. Each signature can be the longest common subsequence of all sequences in the respective cluster and thus representative of the cluster. In such method, each of the plurality of signatures can be a benchmark representative of acceptable behavior of the target program.

19 Claims, 8 Drawing Sheets

LEARNING PROGRAM BEHAVIOR FOR ANOMALY DETECTION

BACKGROUND OF THE INVENTION

1. Field of the Invention

The subject matter of the present application relates generally to techniques for machine learning of program behaviors by observing application level events. One purpose for learning program behavior can be to support run-time anomaly detection, for example.

2. Description of the Related Art

It is desirable to learn the behavior of a computer program before using the computer program in normal service. In that way, when abnormal behavior, i.e., an anomaly, occurs during program execution, the anomaly can be recognized and appropriate action can be taken to avoid possible harm from occurring.

SUMMARY OF THE INVENTION

In accordance with an embodiment of the invention, a method can be provided for learning behavior of a program. For example, a program can be executed while varying a plurality of stimuli provided to the program. Stimuli typically are information received as input to the program. The stimuli can affect results of executing the program. Results of executing the program include events. In one embodiment, the method can include recording a multiplicity of sequences of events of different types. The sequences of events may vary in one or more of a combination of the different types of events, in the order in which events occur in the sequence, or in the combination and in the order in which the different types of events occur. In one embodiment, at least one of the combination or the order in which the events occur in the sequence is determined by the results of executing the program. The multiplicity of sequences can be arranged in a plurality of clusters based on similarities, e.g., edit distances, between the sequences of events. The arrangement of an event sequence in a cluster can be performed in which all of the events in an event sequence are considered. A plurality of signatures corresponding to the plurality of clusters can be determined, where each signature can be a sequence of events which is representative of a respective cluster. Each of the plurality of signatures can be a benchmark representative of acceptable behavior of the program.

In a specific embodiment, a computer-enabled method is provided for learning a behavior of a program. A processor can execute a target program during a learning interval while varying a plurality of stimuli provided to the program, the stimuli affecting results of executing the program, so as to produce a multiplicity of different sequences of events which differ in the combination of types of events in respective sequences, an order in which the types of events occur in respective sequences, or in the combination and in the order in which the types of events occur. The multiplicity of event sequences can be recorded, and a second program can be executed by a processor to (a) determine a plurality of clusters based on similarities between the event sequences; and (b) determine a plurality of signatures corresponding to the plurality of clusters, each signature being a sequence of events representative of a respective cluster. In such method, each of the plurality of signatures can be a benchmark representative of acceptable behavior of the target program.

In accordance with one or more particular embodiments, the method can include varying the stimuli in a multiplicity of ways exemplary of acceptable stimuli to produce event sequences representative of acceptable behavior of the target program, and steps (a) and (b) can be performed during a learning interval of executing the program. In accordance with one or more particular embodiments, the arranging of event sequences in clusters can be performed using a spatial clustering technique, among which is K-means clustering. Spatial clustering can be performed such that when two sequences have relatively small edit distance between them, the two sequences of events can be assigned to one and the same cluster.

In one embodiment, before spatial clustering is performed, principal component analysis can be performed on the matrix of edit distances between every pair of event sequences to reduce the number of dimensions for spatial clustering. In this way, the complexity of spatial clustering can be managed.

In one embodiment, the determination of the signature of a respective cluster can include determining a longest common subsequence of events included in the event sequences of the cluster as the signature for such cluster.

In one embodiment, the arranging of recorded event sequences in clusters can include finding event subsequences in loops which are repeated in at least ones of the event sequences, e.g., by finding sub-string structures in loops which are repeated therein, and generating linearized event sequences which are representative of the repeated sub-strings. The arranging of the recorded event sequences can include arranging the linearized event sequences with the recorded event sequences in the plurality of clusters.

In accordance with one or more particular embodiments, the finding of the repeated event subsequences can include inferring state information regarding the program by analyzing at least some of the recorded event sequences.

In accordance with one or more particular embodiments, the determining of the clusters can be performed by considering the entireties of the event sequences.

In accordance with one embodiment of the invention, a method can be performed which includes further executing the target program during an in-service interval after determining the clusters and determining the signatures of the clusters, Such method can include detecting whether a given sequence of events observed during an in-service interval is anomalous based on a difference between the given sequence of events and cluster signatures.

In a particular embodiment, a detected degree of difference between a given one of the sequences of events and the plurality of signatures is determined based on edit distance between the given sequence of events and cluster signatures.

In a particular example, signatures can be hierarchically ordered. An edit distance can be determined between the given event sequence and one or more signatures. If the edit distance between the event sequence and a signature at a top of a hierarchically ordered group is sufficiently small, further determination can be made of edit distances between the event sequence and other signatures within the hierarchically ordered group to determine which signature is closest to the event sequence.

According to another aspect of the invention, an information processing apparatus is provided which includes a processor and a set of instructions which are executable by the processor to perform a method such as described in the foregoing.

According to another aspect of the invention, a computer-readable medium is provided which has instructions recorded thereon, wherein the instructions are executable by a processor to perform a method such as described in the foregoing.

BRIEF DESCRIPTION OF THE DRAWINGS

FIG. 2A illustrates that the number of dimensions for spatial clustering can be reduced to two.

DETAILED DESCRIPTION

In accordance with an embodiment described herein, a method is provided for learning behavior of a program. In such embodiment, a program installed for use in a processor-enabled system, e.g., computer or other system can be executed during a learning interval while varying a plurality of stimuli thereto. The stimuli can include input information which affects the execution of the program. Results of executing the program can include producing a multiplicity of different sequences of events, which then are recorded. The sequences can differ in the combinations of types of events in respective sequences, the orders in which the types of events occur, or in both the combinations and the orders in which the types of events occurs. The recorded event sequences can be used in determining a plurality of clusters, and signatures can be determined for the respective clusters, where each signature can be sequence of events that is representative of a respective cluster. Each resulting signature can be a benchmark representative of acceptable behavior of the program.

The embodiments provided herein can be applied to learning the behavior of a variety of programs. Some programs, e.g., programs executing on server computers which deliver functionality to many clients or users, are intended to operate on a continuous or near-continuous basis. Such programs may be required to service many different types of requests and may need to respond in a predictable manner even when the input presented during the operation of such programs cannot be completely characterized or predicted in advance.

Programs executed by control systems that operate or monitor facilities, equipment, installations of computer or telecommunications devices or networks and the like, are among programs which have a need to perform predictably and reliably even in the face of unpredicted input thereto. A computer's operating system is another program which has a strong need to perform predictably and reliably even when unpredicted input is received.

One particular type of program can serve as an illustrative example of a method according to an embodiment of the invention. In such example, a program can control operation of an office communications system, such as that loosely referred to as a "PBX". Although the letters PBX are an acronym for "private branch exchange", the abbreviation commonly refers to many different types of analog, digital and combined analog and digital switching systems which provide telephone switching for offices or other communications within an office, facility or organization, even if such systems are not literally a "private branch exchange". Such systems also connect telephone calls between internal telephone locations and external carrier lines. In particular examples, the stimuli can include a signal that a particular telephone in the office served by the system has gone off-hook, that a particular telephone has gone on-hook, and can be key input from a telephone keypad, for example.

A multiplicity of sequences of events are recorded which are determined by the results of executing a target program whose behavior is to be learned. The recorded sequences of events are representative of, and can be considered manifestations of the behavior of the program. In particular, the combination of events and the order of events within each recorded sequence of events are indicative of how the program responds to stimuli. For instance, in the example of a PBX, a sequence of events can include a sequence which occurs when a call is made from one extension of the PBX to another extension and a connection is established. In this case, the word "extension" can refer to one of many numerically dial-able or otherwise addressable internal telephone locations served by the PBX. A recorded event sequence could include, for example, the following: extension 1 goes off-hook (Event A); extension 1 dials a number assigned to extension 2 (Event B); extension 1 receives a ring-back tone from extension 2 (Event C); extension rings (Event D); extension 2 goes off-hook (Event E); a ring-back tone ends at extension 1 (Event F); and the calling extension is now connected with the called extension for voice communication (Event G).

The above-described sequence of events can manifest a normal intended behavior of the program, e.g., PBX control program. However, the control program for a PBX can usually handle more than connecting one extension with another. For example, a control program may need to support services for voice response units ("VRUs"), call forwarding, voice messaging, and conferencing, etc. Moreover, services to an extension are usually available via many different routes. For example, one extension may be dialed from another extension. A voice messaging service can be available when the called extension does not pick up, or when the called extension is busy at the time. The availability of many different services and ways to connect to such services can make it difficult to predict in advance all the ways that a particular control program (e.g., a PBX control program) may be used or, in some cases, misused.

A hypothetical example of malicious misuse of a PBX might be if a PBX could be used without authorization to connect a particular extension to an external carrier line to establish a telephone call to an international destination. One way that the call might be placed without authorization is if the PBX allowed such call to originate not merely from an internal extension served by the PBX, but instead from a connection from an external location outside of the office. In such cases, a connection from the external line which arrives at the PBX system and is immediately forwarded through the PBX to the external carrier line and connected to the international destination could be a veiled attempt by the external caller to appear authorized by the PBX to call the international destination. In such ways, an unauthorized person might steal communication services available through the PBX.

An embodiment of the invention herein can provide a way of learning acceptable behavior of a program by executing the program during a learning interval and determining a plurality of signatures which can be benchmarks representative of acceptable behavior of the program. Then, when executing the program during an in-service interval after the learning interval, the actual in-service operation of the program can be compared with the signatures to determine if there is anomalous, e.g., unexpected, or potentially faulty behavior of the target program. In one example, a benefit of learning acceptable program behavior may be to detect possible malicious misuse of a PBX. In that way, it may be possible for a program executing in a system to block an attempt at misuse, or avoid possible harm from occurring by halting the further progress of an attempt to misuse the system.

Figure 1:
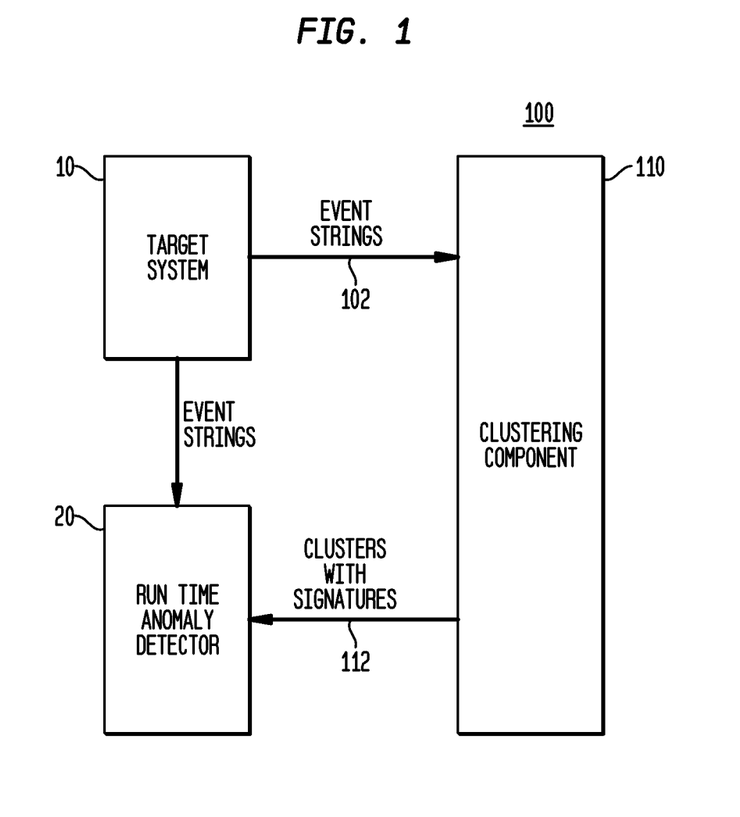
FIG. 1 is a schematic block diagram functionally illustrating a system for learning the behavior of a program, and for detecting an anomaly during execution of a program, in accordance with an embodiment of the invention.

FIG. 1 illustrates a system 100 which can be used to detect occurrence of an anomaly during the execution of a program. In one illustrative example, the system can be used to detect the occurrence of an anomaly during the execution of a program that automatically controls a PBX. System 100 can have two phases of operation: a learning interval in which a target program is executed by a processor to operate a target system 10 under relatively controlled conditions. During the learning interval, a multiplicity of event sequences is recorded, which can then be used by a Clustering Component 110 of the learning program to characterize acceptable behavior of the target system program. Subsequently, during an in-service interval, a Run Time Anomaly Detector 20 can use the characterization of acceptable target program behavior made by the Clustering Component 110 to determine when an anomaly occurs during execution of the target system program.

The Clustering Component 110 can operate with respect to event strings 102, i.e., sequences of events observed during the operation of the target system 10, i.e., during the execution of a target program of target system 10 by a processor. The event strings 102 can be generated during the learning interval of operation of the target system 10. As set forth above, the behavior of a program can be represented by the particular sequences of events which occur. Some of the events can occur in response to stimuli. The Clustering Component 110 can perform a key function in arranging the observable manifestations of behavior of the program, e.g., event sequences, into clusters. The determination of a plurality of clusters based on the event sequences can be performed in which all of the events in an event sequence are considered. This type of operation can be contrasted with techniques which consider only substrings of events of fixed length within a sliding window, e.g., substrings of two, three, four, or five events in length. Such techniques can be referred to as an n-gram technique. Output 112 of the Clustering Component 110 are clusters and the signatures which correspond to the clusters.

In one example, the Clustering Component 110 can determine the plurality of clusters in the following way. The clustering process can be performed based on edit distances among event sequence strings. In such an example, the edit distances among all the event sequences recorded during the learning interval can be determined. When computing edit distance, in one embodiment, each recorded event sequence can be modeled as a character string which is composed from a customized alphabet, the alphabet representing each type of event by one or more alphabetic, alphanumeric or numeric characters, for example. In one example, edit distance between two event sequence strings can be determined as a Levenshtein distance which computes the distance between two event sequence strings as the minimum number of simple edit operations, i.e., character insertions, deletions, and substitutions, that are required to convert one event string into another. The computed edit distances among all the recorded event sequence strings forms an N-dimensional data space, with N being very large, and where N is the number of event sequence strings.

Figure 2A:
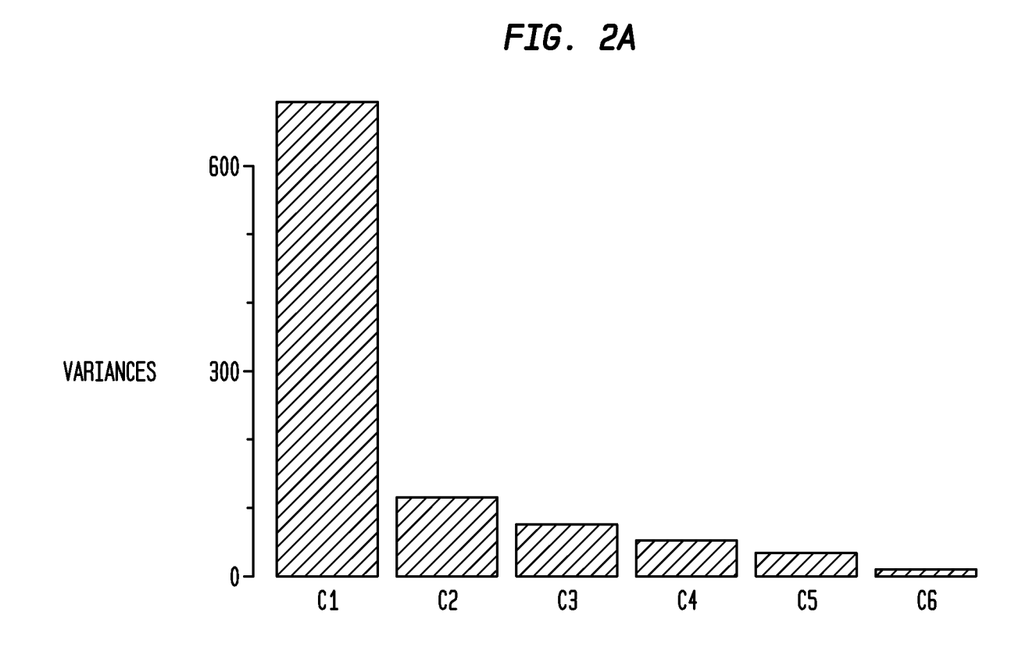
FIG. 2A is a diagram illustrating an example of principal components analysis which can be performed in accordance with one embodiment herein.

The N-dimensional data space of derived edit distances then can be further processed. Principal components analysis ("PCA") can be used to reduce the dimensionality of the N-dimensional data space. PCA can extract components of the given data that are orthogonal to one another, and order them so that each successive component accounts for as much of the remaining variability in that data as possible. For example, a SCREE plot (FIG. 2A) of factor scores derived from the first two principal components can reveal that most of the variability in the distance matrix can be accounted for by sequence scores on these principal components. Results of PCA can include mapping the first two principal component scores for all the recorded event sequence strings as points in a two-dimensional space, as shown illustratively in FIG. 2B as the horizontal scale "PC1 Scores" and the vertical scale "PC2 Scores" therein.

Then, a spatial clustering algorithm, e.g., a K-means algorithm can be applied to the first two principal components scores to determine clusters of similar event sequence strings, based on their proximity within the two-dimensional space. The results of this analysis can be used in determining the content of clusters, and the boundaries between the clusters. For example, in FIG. 2B, the boundaries between clusters 210 are illustratively depicted using dotted lines. In one embodiment spatial clustering algorithms other than a K-means algorithm can be used to determine clusters and the signatures of respective clusters.

Figure 3:
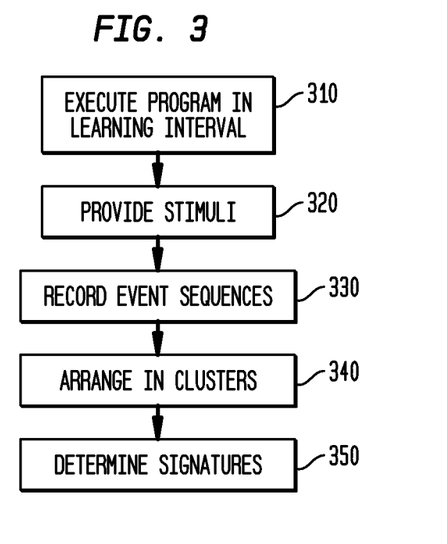
FIG. 3 is a flow diagram illustrating actions in a method of learning a behavior of a program, in accordance with an embodiment of the invention.

A particular example of operation of the Clustering Component 110 will now be described. Assume that an event string: ABCDEFGB is recorded when executing the target system program during a learning interval, the event string representing a sequence of events in which each event is indicated by a different letter of the alphabet, each event occurs in the order it is listed, and each different type of event is indicated by a different letter of the alphabet. Another (second) recorded event string: ABCEFGC, is similar, but not the same. Event "D", which occurs in the first sequence, is absent from the second sequence. Also, event "C" now occurs as the final event in the second event string, rather than event "B". The clustering component 110 determines edit distances of each event string from each other event string observed during the learning phase, finds the corresponding principal components, and uses spatial clustering, e.g., K-means clustering, to determine cluster. Once the clusters of event sequences have been determined, a signature can be determined which is representative of each respective cluster. In one example, the signature can be determined as a longest common subsequence ("LCS") of the plurality of event sequences which belong to the cluster. For example, when the cluster includes event sequences (1) ABCDGGH; and (2) ABDGI, the longest common subsequence ("LCS") is ABDG. Referring to FIG. 3, summarizing the above, in one embodiment of the invention, a method is provided for analyzing the behavior of a target program in response to stimuli provided thereto. In such a method, the target program can be executed during a learning interval (block 310). For example, a learning interval can be an interval other than an in-service interval in which the target program is being executed for use during normal operation. During such a learning interval, stimuli can be provided to the target program (block 320) to exercise one or more functions of the target program. The stimuli can be such as described above, e.g., signals, keypad input, voice input, etc., which affect a result of executing the program, and which can affect occurrence of events which make up the behavior of the program. Desirably, the stimuli provided during execution of the target program are controlled so as to vary in ways which are exemplary of acceptable stimuli.

In block 330, sequences of events which occur during the execution of the target program are recorded. Providing stimuli to exercise various functionality and recording event sequences can be repeated many times. The determination of a plurality of clusters (block 340) based on the recorded sequences of events can be performed by a process of determining edit distances among event sequence strings representing the events, determining principal components scores, and then spatial clustering, e.g., K-means clustering to arrange the event sequences in clusters, and to set boundaries between clusters. Once the clusters are determined, in block 350 a signature can be determined for each respective cluster, such as by determining the longest common subsequence of events which occurs among all of the event sequence strings belonging to the respective cluster.

Figure 4:
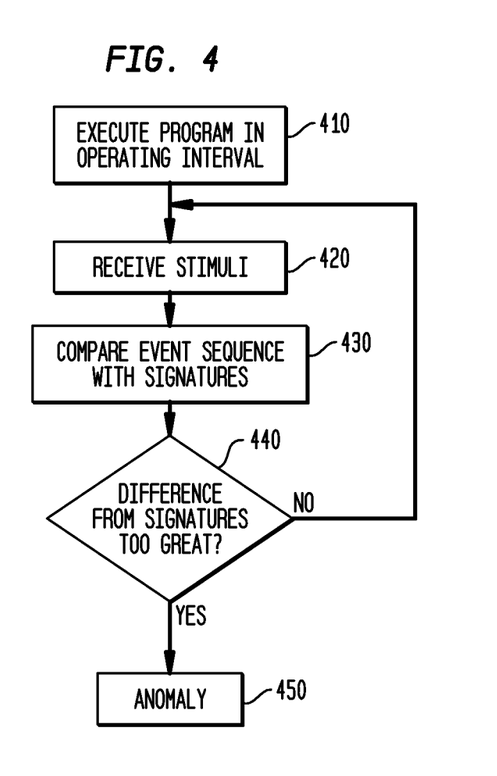
FIG. 4 is a flow diagram illustrating actions in a method of detecting an anomaly during execution of a program, in accordance with an embodiment of the invention.

After performing the above described operations to learn acceptable behavior of the target program and determine a set of representative signatures for the respective clusters, a method can be performed for detecting an anomaly during in-service execution of a target program. In one embodiment, the method can be performed by a "Run Time Anomaly Detector" 20 (FIG. 1) provided for that purpose. Referring to FIG. 4, such method can be performed while a target program is being executed during an operating, i.e., in-service interval of operation (block 410). For example, the method can be performed while the target system 10 (FIG. 1) that is controlled by the program, e.g., a PBX system, is being used in normal service, e.g., for placing and receiving calls and performing other PBX functions. In block 420, stimuli are received by the program. The stimuli can include signals or other input representing events or other occurrences relating to operation of the system. In the illustrative example of a PBX control program, the stimuli can include signals indicating when a particular telephone unit goes off-hook, when the telephone unit is dialing, the number dialed, whether a ring-back tone is active, for example, as well as many others.

Figure 2B:
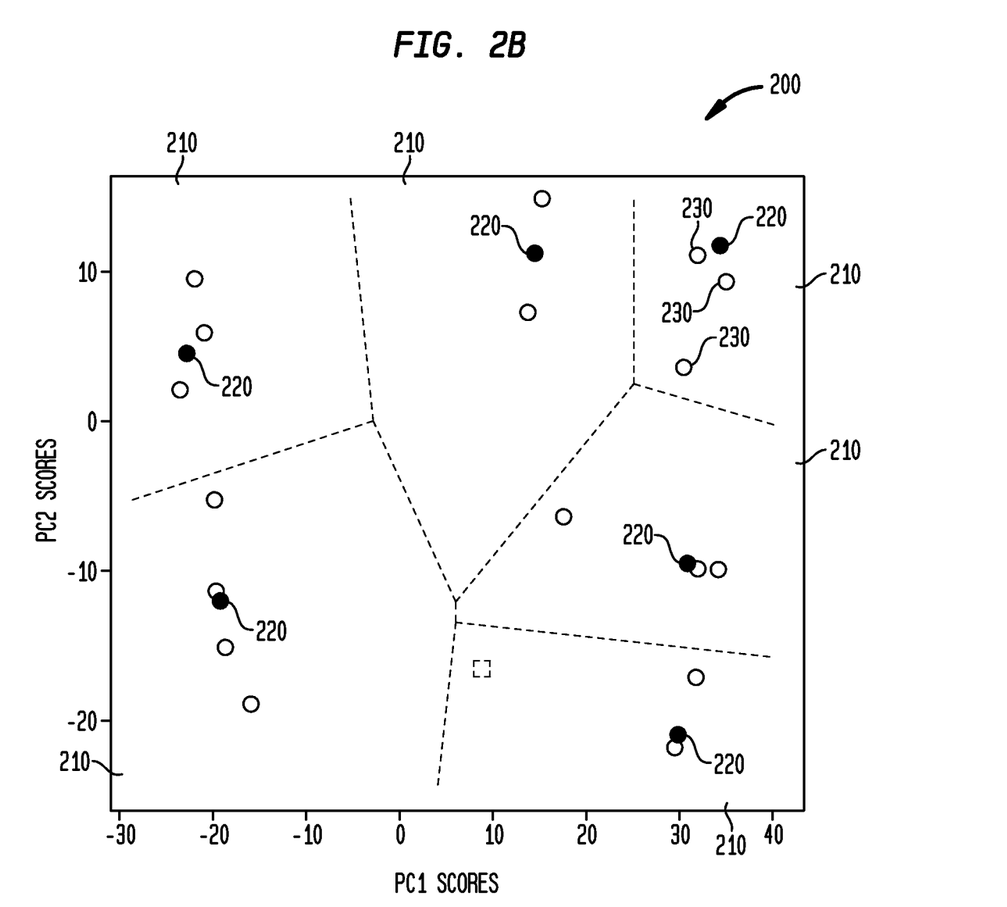
FIG. 2B is a diagram illustrating an arrangement of event sequences in a plurality of clusters, in accordance with an embodiment of the invention.

In block 430, event sequences which occur during operation of the target system 10 can be compared with the signatures of the respective clusters 210 (FIG. 2B). For example, the edit distance between a current event sequence and each signature can be determined. When it is determined that there is a small difference (e.g., a small edit distance) between the current event sequence and the signature of the cluster in which that sequence is placed, it can be determined (block 440) that no anomaly is present. Then, the method can continue again from block 420. Within a context of a distribution of event sequences which includes a plurality of quantiles and a signature at a center among the quantiles, in one embodiment, a "small" edit distance from the signature means an edit distance that falls within a quantile of the distribution that is relatively close to the signature. On the other hand, when the edit distance falls within a quantile of the distribution which is relatively far from the signature, that edit distance will not be a small edit distance.

When it is determined that there is not a small difference (e.g., not a small edit distance) between the current event sequence and the signature of the corresponding cluster, processing may then continue at block 450, in which case an alarm can be generated for a human operator (system administrator) indicating that an anomaly is present. In one embodiment, an alarm indicating an anomaly is present can be displayed, printed or sounded audibly. A system administrator who notices the alert can then take an appropriate action, e.g., enabling or disabling particular function of a system from which the alert originated. In one example, if the anomaly is judged severe, the system administrator can isolate, suspend execution of, reset or shut down the system which generated the alert while a solution is determined.

Figure 5:
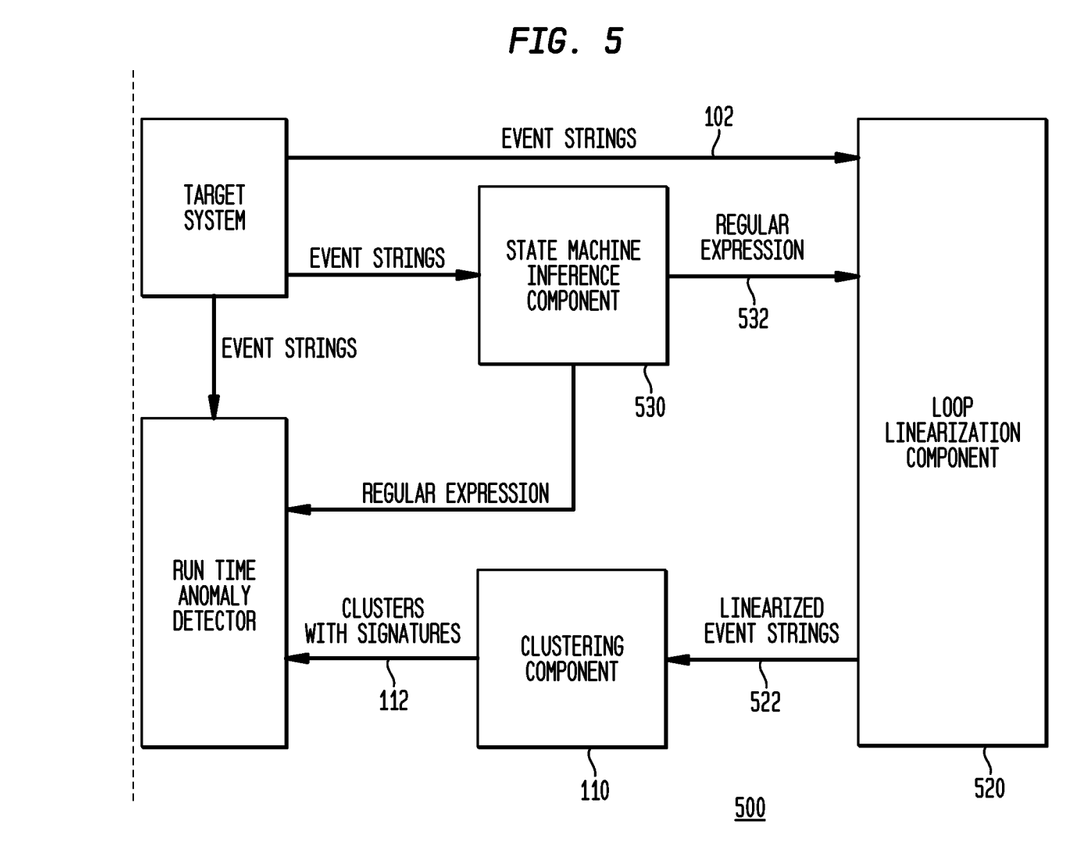
FIG. 5 is a schematic block diagram functionally illustrating a system for learning the behavior of a program, and for detecting an anomaly during execution of a program, in accordance with a variation of the embodiment of the invention.

In a variation of the above-described system (FIGS. 1, 2A and 2B), a system 500 (FIG. 5) for learning the behavior of a program the system can include one or more additional main components which can operate together with the Clustering Component 110 to 'learn' acceptable behaviors of a program under test. In a particular embodiment shown in FIG. 5, the system 500 can include three main components: the Clustering Component 110, having a function as described above, a Loop Linearization component 520, and a State Machine Inference component 530. As seen in FIG. 5, the Loop Linearization Component 520 can also participate in the processing of event sequences during the execution of the program. This component can reduce event sequences which include some repeated events into simplified representations. For example, the Loop Linearization Component 520 can recognize that the following sequence of events: IABDEGABDEGT contains the subsequence ABDEG, and that that subsequence is repeated twice. Therefore, the Loop Linearization Component 520 replaces the event sequence IABDEGABDEGT with the expression: I(ABDEG)2T. Having simplified the expression for an event sequence that contains a repeated subsequence, the Clustering Component 510 can now determine that the edit distance between the simplified expression I(ABDEG)2T and IABDEGT is much less than the edit distance between IABDEGABDEGT and IABDEGT. Moreover, other ways of simplifying expressions are possible. For example, an original event sequence IACDEGABDFGT can be replaced with the expression I(A(B|C)D(E|F)G)2T. In this way, the linearization can take into account arbitrary looping where different loop iterations may produce different event sequences while capturing proximity to the extent possible among various event sequences for clustering purposes.

A State Machine Inference Component 530 can be used to infer state information from the program under test by analyzing event sequences that occur while executing the program during the learning interval. The problem of determining a regular expression from a given set of event sequences is the same as that of inferring a finite state machine (FSM) that accepts those sequences. Determining an appropriate solution to this problem is computationally hard, i.e., requiring unusually large amounts of computing resources. Determining a solution to this problem can also require determining and analyzing examples of sequences that should be rejected as input.

In one embodiment, to avoid requiring excessive resources, the State Machine Inference Component 530 takes a practical approach to derive state information from data contained in the events themselves. To do so, the State Machine Inference Component 530 can discover and use clues about the internal "states" of a program from the events when they were emitted. Continuing with the above-discussed illustrative example of a PBX control program as one example of a target program whose behavior is to be learned, state information can be obtained from at least some events of the event sequences which occur during operation of such program.

When executing a PBX control program, for example, some events contain a field that reports the status of telephone line or channel which is involved. Such events can be recorded with description in a field using terms like "Ringing", "Busy", "Up", or "Down". Such field can provide a direct clue about the internal state of the corresponding phone line. However, these states are not unique for a particular type of call; rather, the states are shared by phone lines involved in all types of calls: incoming calls, outgoing calls, internal calls, conference calls, interactive voice response ("IVR") sessions, etc. Therefore, it may be beneficial to further distinguish between such states based on the type of the call.

In the illustrative example of learning the behavior of a PBX control program as the target program, one feature of such program is that different types of calls can be handled by different parts of dial plans for the PBX system, the dial plans being, in essence, scripts which direct the PBX how to handle various types of calls. In the case of Asterisk, an open source PBX, for example, one type of event which can provide more information for the event record is "NewExtenEvent". This type of event can contain three fields: "context", "extension", and "priority", which together provide further clues about which part of the scripts are responsible for generating an event. The "context" field may directly name the command group in the dial plan that is now handling that call. The "extension" field can identify the physical or logical keys that were dialed or pressed. The "priority" field can identify the position of the current command in the command group that led to the generation of that event. Combinations of values in these fields, along with the values of the aforementioned channel status field can be used to derive states in the inferred finite state machine.

Figure 6:
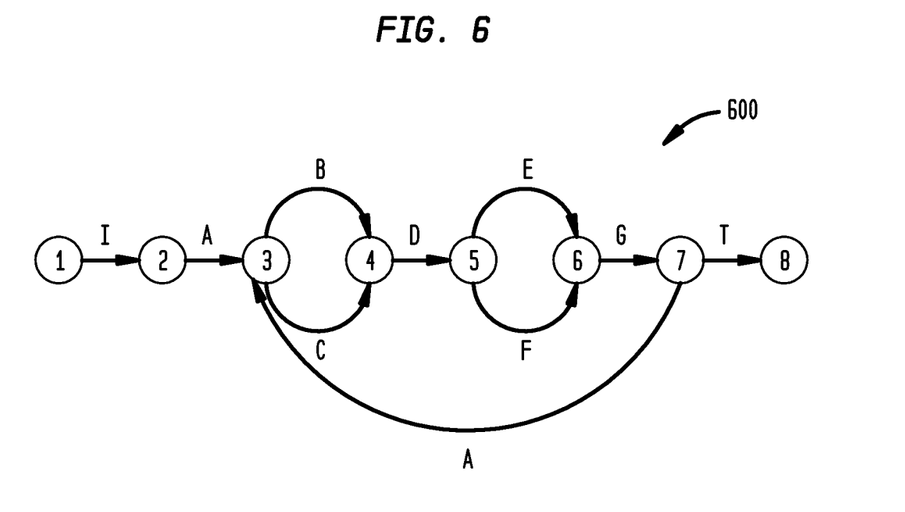
FIG. 6 is a diagram illustrating an inferred state machine showing repetitiveness of events produced.

FIG. 6 is an inferred state diagram that illustrates a result of analysis performed by the State Machine Inference Component 530. As illustrated in FIG. 6, events of types selected from the group consisting of I, A, B, C, D, E, F, G, and T are recorded during the execution of the target program. The events do not necessarily occur in the order IABCDEFGT, nor do all such events usually occur in one sequence. In fact, FIG. 6 shows a result of analysis that event A occurs only after either event I or event G, and that event A only occurs sometimes after event G. In addition, the State Machine Inference Component also determines that event B and event C are alternative events which can occur only after event A, and that event E and event F are alternative events which can occur only after event D. Through analyzing relationships between events such as these, the State Machine Inference Component can determine the structure of an inferred state machine 600 (FIG. 6) which describes the operational states of the target program during execution.

As seen in the inferred state machine description 600, for example, the State Machine Inference Component 530 (FIG. 5) has determined that the program under test has eight different states. The states are listed 1, 2, 3, . . . , 8 in FIG. 6. Observed events I, A, B, C, D, E, F, G, and T are emitted when the program transitions from one state to another. The Loop Linearization Component 520 (FIG. 5) can regularize expressions for event sequences that contain alternative expressions therein. The Loop Linearization Component 520 can determine from the inferred state machine 600 (FIG. 6) that two different types of events normally occur in the alternative. For example, according to the state machine diagram 600, events B or C normally only occur in the alternative following another different type of event, for example, event A. Also, according to the state machine diagram 600, events E or F normally only occur in the alternative following another different type of event, for example, event D. The regular expression 532 produced by the State Machine Inference Component 530, which includes state information, i.e., correspondence between recordable events and the internal state of the programmed system, can then be provided to the Loop Linearization Component 520, as seen in FIG. 5. As described above, the Loop Linearization Component 520 can produce simplified expression regarding recorded event sequences, i.e., "linearized event strings" 522, which then are provided to the Clustering Component 110, having function as described above.

Figure 7:
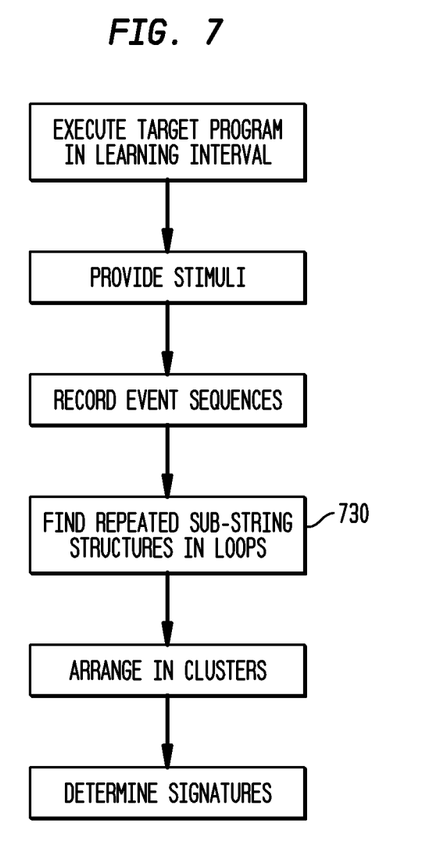
FIG. 7 is a flow diagram illustrating actions in a method of learning the behavior of a program, in accordance with a variation of an embodiment of the invention.

FIG. 7 is a flow diagram illustrating a method of learning the behavior of a program in accordance with a variation of the above-described embodiment (FIG. 3). In this variation, loop linearization is performed, such as described above with respect to FIG. 5. Loop Linearization can be referred to as a method of finding "repeated sub-string structures in loops", as indicated in block 730. The method illustrated in FIG. 7 can differ from the method described in FIG. 3 with the insertion of an additional block 730. Block 730 relates to handling of event sequences which include repeated substring structures, e.g., subsequences which are the same or nearly the same and can be described by simplified expression. For example, an event sequence such as the sequence IABDEGABDEGT noted above, can be described with the simplified expression: I(ABDEG)2T. Also, in another example, an original event sequence IACDEGABDFGT can be replaced with the expression I(A(B|C)D(E|F)G)2T. The rest of the actions performed in accordance with this variation can be the same as those described above with reference to FIG. 3. The addition of the extra step 730 enables event sequences that have repeated substrings to be clustered together. If not for this step 730, these strings may be placed in different clusters, as edit distance is very sensitive to the lengths of the strings compared.

Figure 8:
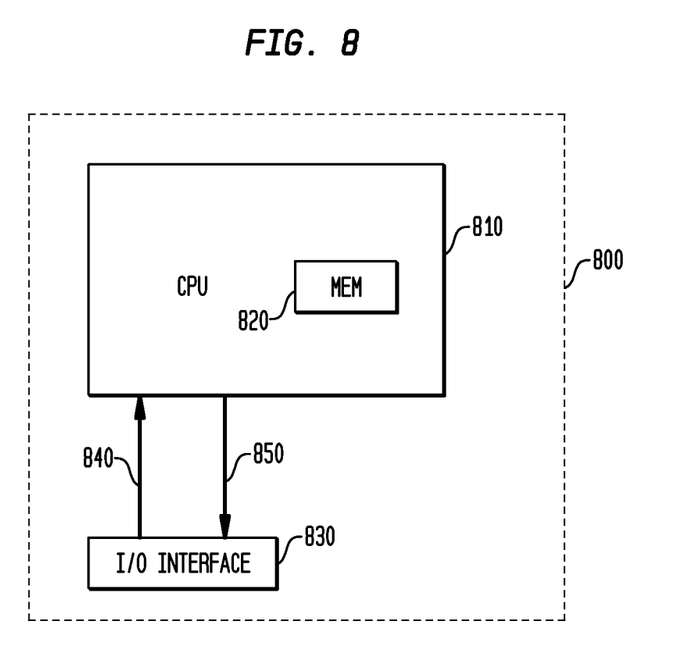
FIG. 8 is a block and schematic diagram illustrating an information processing apparatus having a processor in accordance with an embodiment of the invention.

FIG. 8 illustrates an information processing apparatus 800 in accordance with an embodiment of the invention. As shown in FIG. 8, the information processing apparatus can include a central processing unit (CPU) 810 provided with a memory 820. The CPU 810 may include a single processor or a plurality of processors arranged to execute instructions of a program in a parallel or semi-parallel manner. An input output (I/O) interface 830 is be provided for inputting a program including instructions and data to the CPU 810 for execution of the instructions or portion thereof and for outputting the results of executing the instructions. While the I/O interface need not have any particular configuration or specific features, the I/O interface 830 may include an optical, magnetic or electrical scanning or reading function, for example, and may include one or more types of equipment for reading the contents of storage media. Storage media can include, for example, but are not limited to a magnetic disk, magneto-optic disk, read/write and/or read only optical disc, tape, removable or non-removable disk drive and/or removable or non-removable memory, e.g., a semiconductor memory such as a memory card, and other sources of stored information that can be read optically, magnetically or electrically. In addition to or in place thereof, the I/O interface can include a network interface such as a modem or network adapter card for permitting transfer of information to and from a network. In one example, the I/O interface 830 may include a display for outputting information (events and alarms) to and/or inputting information (stimuli) from a user. To the extent that any of the above described types of storage media can be present at the I/O interface, a program containing a set of instructions to perform a method for learning the behavior of a target program can be stored in such storage medium. A set of instructions in such program can be received as input 840 through the I/O interface 830 to the CPU 810. In addition to such instructions, a corresponding set of data to be operated upon by the instructions can also be received as input through the I/O interface 830. Once instructions and data to be operated are received by the CPU 810, the CPU can execute instructions relative to the corresponding data and provide output 850 to the I/O interface 830.

In an embodiment, a program containing instructions for performing a method of learning a behavior of a target program can be stored on one or more removable storage media to be provided to the I/O interface 830, the instructions then being loaded into the CPU 810. Alternatively, the program can be stored in a fixed system storage medium of a computer, e.g., a hard-disk drive memory, electronic memory system or other storage medium of the computer which is designed to be a permanent part of the computer, although such part may be replaceable when upgrading the computer with a different fixed storage medium or when repairing a malfunctioning storage medium. In a particular embodiment, a set of instructions included in the program can be received from a storage medium such as a memory of one or more computers or other storage devices of a network at a modem, network adapter or other device of the I/O interface 830 and received at the CPU 810. The CPU 810 can then execute the instructions relative to a set of data provided to the CPU 810. The instructions of a program used to learn the behavior of a target program, for example, can be executed by a processor relative to a data set which includes a multiplicity of event sequences recorded based on execution of the target program, to arrange the recorded event sequences in a plurality of clusters, and determine a plurality of signatures representative of the respective clusters, each signature being a benchmark representative of acceptable behavior of the target program.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements can be devised without departing from the spirit and scope of the present invention as defined by the appended claims.

The invention claimed is:

1. A computer-enabled method of learning behavior of a program, comprising:
    (a) using a processor to execute a target program during a learning interval while varying a plurality of stimuli provided to the target program, the stimuli affecting execution of the target program, so as to produce a multiplicity of different sequences of events, the event sequences differing in combinations of types of events in respective sequences, orders in which the types of events occur in respective sequences, or in the combinations and in the orders in which the types of events occur;
    (b) recording the multiplicity of event sequences; and
    (c) executing a second program by a processor to: (i) determine a plurality of clusters based on similarities between the recorded event sequences in their entirety; and (ii) determine a plurality of signatures corresponding to the plurality of clusters, each signature being a sequence of events representative of a respective cluster,
    wherein each of the plurality of signatures is a benchmark representative of acceptable behavior of the target program.

2. A method as claimed in claim 1, wherein step (c) is performed using spatial clustering.

3. A method as claimed in claim 1, wherein the determination of each signature includes determining a longest common subsequence of events included in each event sequence in the respective cluster as the signature for each respective cluster.

4. A method as claimed in claim 1, wherein step (c) includes finding event subsequences which are repeated in at least ones of the event sequences and generating linearized event sequences representative of the repeated subsequences therein, and wherein the determining of the clusters in step (c) includes determining the clusters based on the linearized event sequences and the recorded event sequences.

5. A method as claimed in claim 4, wherein the finding of the repeated event subsequences includes inferring state information regarding the target program by analyzing at least some of the recorded event sequences, at least some of the linearized event sequences, or at least some of the recorded event sequences and at least some of the linearized event sequences.

6. A method as claimed in claim 1, wherein step (b) includes recording said event sequences in their entirety and step (c) is performed considering the entireties of said event sequences.

7. A method as claimed in claim 1, further comprising:
    (d) further executing the target program during an in-service interval after performing steps (a) through (c), and detecting whether a given sequence of events is anomalous based on a difference between the given sequence of events and each of the cluster signatures.

8. A method as claimed in claim 7, wherein the detected degree of difference is based on edit distance between the given sequence of events and the plurality of signatures.

9. A method as claimed in claim 8, wherein each cluster is representative of a distribution of edit distances from the signature of each cluster, the distribution having a plurality of quantiles extending outward from the signature, and the detecting of whether a given event sequence is anomalous includes determining in which quantile of the distribution the given event sequence occurs.

10. An information processing apparatus, comprising:
    a processor; and
    instructions executable by the processor to perform a method, the method including:
    (a) the use of a processor to execute a target program during a learning interval while varying a plurality of stimuli provided to the target program so as to produce a multiplicity of different sequences of events, the event sequences differing in combinations of types of events in respective sequences, orders in which the types of events occur in respective sequences, or in the combinations and in the orders in which the types of events occur;
    (b) recording the multiplicity of event sequences;
    (c) executing a second program by a processor to: (i) determine a plurality of clusters based on similarities between the event sequences in their entirety; and (ii) determine a plurality of signatures corresponding to the plurality of clusters, each signature being a sequence of events representative of a respective cluster,
    wherein each of the plurality of signatures is a benchmark representative of acceptable behavior of the target program.

11. An information processing apparatus as claimed in claim 10, wherein step (a) includes varying the stimuli only in the multiplicity of ways exemplary of acceptable stimuli to produce only event sequences representative of acceptable behavior.

12. An information processing apparatus as claimed in claim 10, wherein the determination of each signature in step (c) includes determining a longest common subsequence of events included in each event sequence in the respective cluster as the signature for each respective cluster.

13. An information processing apparatus as claimed in claim 10, wherein step (c) of the method includes finding event subsequences which are repeated in at least ones of the event sequences and generating linearized event sequences representative of the repeated subsequences therein, and wherein the determining of the clusters is performed using linearized event sequences.

14. An information processing apparatus as claimed in claim 13, wherein the finding of the repeated event subsequences includes inferring state information regarding the target program by analyzing the recorded event sequences.

15. A non-transitory computer-readable storage medium, the storage medium having a set of instructions recorded thereon, the instructions being executable by a processor to perform a method, the method including:
(a) using a processor to execute a target program during a learning interval while varying a plurality of stimuli provided to the target program, the stimuli affecting results of executing the target program so as to produce a multiplicity of different sequences of events, the event sequences differing in combinations of types of events in respective sequences, orders in which the types of events occur in respective sequences, or in the combinations and in the orders in which the types of events occur;
(b) recording the multiplicity of event sequences;
(c) executing a second program by a processor to: (i) determine a plurality of clusters based on similarities between the event sequences in their entirety; and (ii) determine a plurality of signatures corresponding to the plurality of clusters, each signature being a sequence of events representative of a respective cluster,
wherein each of the plurality of signatures is a benchmark representative of acceptable behavior of the target program.

16. A computer-readable storage medium as claimed in claim 15, wherein step (a) of the method includes varying the stimuli only in the multiplicity of ways exemplary of acceptable stimuli to produce only event sequences representative of acceptable behavior.

17. A computer-readable storage medium as claimed in claim 15, wherein step (c) of the method includes determining a longest common subsequence of events included in each event sequence in the respective cluster as the signature for each respective cluster.

18. A computer-readable storage medium as claimed in claim 15, wherein step (c) of the method includes finding event subsequences which are repeated in at least ones of the event sequences and generating linearized event sequences representative of the repeated subsequences therein, and wherein the determining of the clusters in step (c) includes determining the clusters based on the linearized event sequences and the recorded event sequences.

19. A computer-readable storage medium as claimed in claim 15, wherein the finding of the repeated event subsequences includes inferring state information regarding the target program by analyzing recorded event sequences.

* * * * *